US007998414B2

(12) United States Patent
Mozdy et al.

(10) Patent No.: US 7,998,414 B2
(45) Date of Patent: Aug. 16, 2011

(54) SYSTEM FOR HIGH THROUGHPUT GPCR FUNCTIONAL ASSAY

(75) Inventors: Eric J. Mozdy, Taipei (TW); Hui Su, Big Flats, NY (US); Qi Wu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 759 days.

(21) Appl. No.: 11/893,506

(22) Filed: Aug. 16, 2007

(65) Prior Publication Data

US 2008/0207466 A1 Aug. 28, 2008

Related U.S. Application Data

(60) Provisional application No. 60/903,993, filed on Feb. 28, 2007.

(51) Int. Cl.
*G01N 21/64* (2006.01)

(52) U.S. Cl. .................................... 422/82.08; 436/518

(58) Field of Classification Search ........................ None
See application file for complete search history.

(56) References Cited

U.S. PATENT DOCUMENTS

| | | | | |
|---|---|---|---|---|
| 4,922,092 | A * | 5/1990 | Rushbrooke et al. | 250/214 VT |
| 5,470,710 | A * | 11/1995 | Weiss et al. | 435/6 |
| 5,523,573 | A * | 6/1996 | Hanninen et al. | 250/459.1 |
| 6,004,808 | A | 12/1999 | Negulescu et al. | 435/325 |
| 6,242,268 | B1 | 6/2001 | Wieder et al. | 436/538 |
| 6,750,023 | B2 | 6/2004 | Tanner et al. | 435/6 |
| 6,794,658 | B2 | 9/2004 | MacAulay et al. | 250/458.1 |
| 6,856,390 | B2 * | 2/2005 | Nordman et al. | 356/344 |
| 6,977,155 | B2 | 12/2005 | Lahiri et al. | 435/7.2 |
| 7,072,036 | B2 | 7/2006 | Jones et al. | 356/246 |
| 7,384,779 | B2 * | 6/2008 | Fang et al. | 435/287.1 |
| 7,576,862 | B2 * | 8/2009 | Cromwell et al. | 356/445 |
| 7,632,653 | B2 * | 12/2009 | Song et al. | 435/7.92 |
| 2002/0094544 | A1 | 7/2002 | Fang et al. | 435/7.9 |
| 2003/0008314 | A1 * | 1/2003 | Priuska et al. | 435/6 |
| 2004/0249227 | A1 | 12/2004 | Klapproth et al. | 585/250 |
| 2004/0262534 | A1 | 12/2004 | MacAulay et al. | 250/458.1 |
| 2005/0069953 | A1 | 3/2005 | Fang et al. | 435/7.1 |
| 2005/0227241 | A1 | 10/2005 | Fang et al. | 435/6 |
| 2005/0260685 | A1 | 11/2005 | Fang et al. | 435/7.1 |
| 2005/0269523 | A1 | 12/2005 | MacAulay et al. | 250/458.1 |
| 2006/0008855 | A1 | 1/2006 | Negulescu et al. | 435/7.2 |
| 2006/0141486 | A1 | 6/2006 | Coonan et al. | 435/6 |
| 2006/0147993 | A1 | 7/2006 | Carre et al. | 435/7.1 |
| 2006/0148006 | A1 | 7/2006 | Fang et al. | 435/7.2 |
| 2006/0205015 | A1 | 9/2006 | Ansanay et al. | 435/7.1 |

OTHER PUBLICATIONS

L.A.A. de Jong et al., "Receptor-ligand binding assays: Technologies and Applications", Journal of Chromatography B (2005), vol. 829, pp. 1-25.

Perkin Elmer, "Time-resolved fluorescence based GTP binding assay for G-Protein coupled receptors", Application Notes, Drug Discovery, Research, Clinical Screening, pp. 1-7, 2002.

W.R. Leifert et al., "G-Protein-Coupled Receptors in Drug Discovery: Nanosizing Using Cell-Free Technologies and Molecular Biology Approaches", Journal of Biomolecular Screening X(X) (2005), pp. 1-15.

G. Warner et al., "Automation of a Time-Resolved Fluorescence Based GTP Binding Assay for G-Protein Coupled Receptors", PerkinElmer Life and Analytical Sciences, pp. 1-7, 2003.

"CCD vs. CMOS", http://www.dalsa.com/markets/ccd_vs_cmos.asp, pp. 1-4, 2007.

R.M. Eglen, "An Overview of High Throughput Screening at G Protein Coupled Receptors", Frontiers in Drug Design & Discovery (2005), vol. 1, pp. 97-111.

"Time-Resolved Fluorescence (TRF)", http://www.biopal.com/Fluorescent.htm, BioPhysics Assay Laboratory, Inc., pp. 1-2, 2007.

Y. Hong et al., "Functional GPCR Microarrays", Journal of the American Chemical Society (2005), vol. 127, No. 44, pp. 15350-15351.

R. Nakamura et al., "Double-gated spectral snapshots for biomolecular fluorescence", Journal of Luminescence (2007), vol. 122-123, pp. 297-300.

A. Hennig et al., "Design of peptide substrates for nanosecond time-resolved fluorescence assays of proteases: 2,3-Diazabicyclo[2.2.2]oct-2-ene as a non-invasive fluorophore", Analytical Biochemistry (2006), doi:10.1016/j.ab.2006.09.015.

V. Laitala et al., "Time-resolved detection probe for homogeneous nucleic acid analyses in one-step format", Anal. Biochem. (2007), doi: 10.1016/j.ab.2006.11.015.

G. Warner et al., "Time Resolved Fluorescence Based GTP Binding Assay for G-Protein Coupled Receptors", PerkinElmer Life Sciences, pp. 1-8, (2002).

I.A. Hemmil et al., "Novel detection strategies for drug discovery", Drug Discovery Today (2002), vol. 7, No. 18 (Suppl.), pp. S150-S156.

J.T. Groves et al., "Micropattern Formation in Supported Lipid Membranes", Acc. Chem. Res. (2002), vol. 35, pp. 149-157.

* cited by examiner

*Primary Examiner* — Ann Lam
(74) *Attorney, Agent, or Firm* — John L. Haack

(57) ABSTRACT

A functional assay detection system for membrane bound proteins. The system comprises a biological array including a porous substrate having a plurality of membranes adhered thereto and a first side and a second side, a fluorescent labeling reagent configured to couple to the membrane bound proteins, a pulsed light assembly configured to excite the fluorescent labeling reagent, and a time-delayed imaging device configured to capture emitted fluorescence of the fluorescent labeling reagent. The pulsed light assembly is configured to excite the fluorescent labeling reagent from at least one of the first side and the second side of the porous substrate, and the fluorescent labeling reagent comprises a fluorophore that has an emission lifetime that is in the range of microseconds.

19 Claims, 6 Drawing Sheets

SYSTEM FOR HIGH THROUGHPUT GPCR FUNCTIONAL ASSAY

CROSS-REFERENCE TO RELATED APPLICATIONS

This application claims the benefit of U.S. Application Ser. No. 60/903,993 filed on Feb. 28, 2007 and entitled "System for High Throughput GPCR Functional Assay" which is incorporated by reference herein in.

TECHNICAL FIELD

The present invention relates to high throughput G protein-coupled receptor (GPCR) functional assays, and more particularly to systems for detecting GPCR microarrays on porous glass surfaces in a micro-plate format.

BACKGROUND OF THE INVENTION

GPCRs on cell membranes participate in a variety of cell signaling pathways and are one of the most popular targets for new therapeutics. Currently around 30% of clinically prescribed drugs act on GPCR family members. (see "Application Notes: Time-resolved fluorescence based GTP binding assay for G-Protein coupled receptors," PerkinElmer Life Sciences, www.perkinelmer.com/lifesciences). Moreover, GPCRs are associated with almost every major therapeutic category or disease class, including pain, asthma, inflammation, obesity, cancer, as well as cardiovascular, metabolic, gastrointestinal and central nervous system diseases. The tremendous significance of drugs targeting GPCRs lies in the physiological roles of GPCRs as cell-surface receptors responsible for transducing exogenous signals into intracellular response(s). (see Haga, T., and Berstein, G., G-Protein-Coupled Receptors, CRC Press, Boca Raton, Fla., 1999.) Signaling through these receptors regulates a wide variety of physiological processes, such as neurotransmission, chemotaxis, inflammation, cell proliferation, cardiac and smooth muscle contractility, as well as visual and chemosensory perception. In addition to the role that normal receptors play in modulating physiological processes, GPCR mutations that result in both gain and loss of function are associated with certain human diseases. For example, GPCR polymorphisms have been linked with hypertension, idiopathic cardiomyopathy (endothelin A receptor), autosomal dominant hypocalcemia and familial hypocalciuric hypercalcemia (calcium-sensing receptor), follicular maturation arrest and suppression of spermatogenesis (follicle-stimulating hormone receptor), and bronchodilator desensitization and nocturnal asthma ($\beta$2-adrenoceptors).

In the human genome there are about 400-700 GPCRs of therapeutic relevance; of these GPCRs, ligands for about 200 have been discovered. (see Pierce, K. L. et al., "Seven-Transmembrane Receptors." Nat. Rev. Mol. Cell Biol. 2002, v. 3, 639-650.) Although there is very little conservation at the amino acid level among GPCR sequences, all GPCRs share certain structural and mechanistic features. Typically, GPCRs are formed of seven-helical trans-membrane-spanning domains (each approximately 20-30 amino acids in length) joined by intra- and extra-cellular loops. The spatial organization of these trans-membrane regions, the extra-cellular N-terminus and the extracellular loops, form the binding sites or testing targets for extra-cellular ligands. The intracellular loops and carboxyl-terminus form the sites of interaction with signal-transducing heterotrimeric G-proteins and other regulatory proteins, such as receptor kinases and arrestins. A wide variety of ligand species, including biogenic amines, peptides and proteins, lipids, nucleotides, excitatory amino acids and ions, small chemical compounds, etc., can activate GPCRs.

Functionally, the GPCR participated cell signaling pathway (signal transduction) begins with the binding of an extracellular substance (ion, small molecule, protein) to an extracellular domain of the GPCR. Binding of the substance to an extracellular domain of the transmembrane protein causes the protein to change from an inactive form to an active form. Once activated, the protein stimulates catalytic activity, or some similar such response, that generates a cytosolic signal (which is sometimes in the form of one or more secondary messenger substances in the cytoplasm). There are two major types of such signal transductions in mammalian cells: (i) the transmembrane protein may have a protein kinase activity in its cytosolic domain, the activity of which is activated when the extracellular substance binds to the transmembrane protein (the kinase then phosphorylates its own cytoplasmic domain, which enables the transmembrane protein to associate and activate another protein, which in turn acts on other proteins and substances within the cell cytoplasm); and (ii) the transmembrane protein may interact with a G protein that is associated with the membrane, which causes the GDP (guanine diphosphate) bound to the G protein to be replaced by GTP, resulting in dissociation of the G protein into monomer and dimmer fragments, one or both of which, in turn, acts upon a target protein (also often associated with the membrane, requiring it to then act upon yet another target protein, this one in the cytoplasm).

Given the importance of G-protein-coupled receptors as drug targets, a wide range of technologies have been developed that screen compounds against GPCRs. (e.g., Hemmila, I. A., and Hurskainen, P., "Novel Detection Strategies for Drug Discovery," Drug Discov. Today 2002, 7, S152-S156.) Two types of assays that can be performed to screen GPCRs include GPCR binding assays and GPCR functional assays. GPCR binding assays screen extracellular molecules that can bind to the extracellular domain of the GPCRs, while GPCR functional assays screen the G-protein activation or deactivation by the extracellular molecules (agonist or antagonist) that bind to the GPCRs.

As is generally known, functional assays using GPCR microarrays are essential for investigating "orphan" GPCRs, some of which may turn out to be key drug targets. Orphan GPCRs are those without known ligands, which preclude the use of competition assays employing known labeled ligands. Functional assays can be both cell-based and biochemical in nature. Cell based assays include reporter gene assays, P-arrestin and GPCR-GFP translocation assays (i.e., receptor internalization and endosome formation). Methods for monitoring the activation of GPCRs by non-cell based assays are mostly limited to monitoring GTP-GDP exchange at the GPCR associated G$\alpha$ protein using labeled GTP analogues (e.g., $^{35}$S-GTP $\gamma$S or Europium-labeled GTP—"Eu-GTP"). These GPCR functional assays are typically performed in a homogeneous solution and use a radioactive labeling approach or Europium (Eu) label based time-delayed fluorescence. The receptor and the GTP analogue in a homogenous assay are mixed with or without a compound of interest and are in a solution over the duration of the assay. These assays are then subject to filtration using a filter microplate so that the labeled GTP can be removed by filtration, and only the bound GTP analog molecules can be quantified and the effect of the compound on the binding of GTP analog can be examined, which can be used to classify the action of the compound on the receptors (i.e., non-binder, or antagonist, or agonist, etc).

While Eu label based GPCR functional assays have significant advantages over traditional labeling assays, such as having no radioactivity risks, performing these functional assays in a homogeneous format limits their throughput characteristics. Porous substrate surfaces have been developed that allow GPCR functional assays to be performed in a micro-array format (see for example U.S. patent application Ser. No. 10/822,385 to Fang et al, the disclosure of which is incorporated in its entirety herein by this reference). These substrates comprise a 3-D structure that allows access to both sides of the membrane protein and enables the functional activation of the protein arrays. However, it has been discovered that traditional time-resolved fluorometers have difficulty measuring the array assay results on these substrates. Thus, it would be desirable to have a system for measuring the array assay results for porous substrate surfaces.

SUMMARY OF THE INVENTION

The present invention is directed to a detection system for measuring fluorescent based assays on a porous substrate. The system enables direct and simultaneous detection of functional and multiplexed assay results, and can be performed at a high rate of speed in a high throughput assay format. Moreover, the process is also capable of being performed without radioactive labeling reagents and offers high signal to noise ratio detection using time-delay fluorescence imaging techniques.

According to one aspect of the present invention, a detection system for a GPCR microarray on a porous glass surface in micro-plate format is provided. According to this aspect, the GPCR membrane arrays are created on porous substrates in individual wells of a micro-plate by dispensing a desired amount of GPCR membrane aliquot onto the porous substrate surface. A functional assay protocol is then performed in each well to screen the activation or deactivation of GPCRs arrays by different antagonists. After the functional assay protocol is performed, the activation or deactivation level of the GPCRs by the antagonists is then determined by analyzing the amount of a labeling reagent that binds to the GPCRs. To analyze the amount of binding, the detection system uses a pulsed UV laser and excites the fluorescent labeling reagent in the GPCR arrays in the individual wells of the micro-plate. The emitted fluorescence of the labeling reagent is then captured by an ICCD camera with a delay after each laser pulse and integrated into an output image after a desired exposure time. The UV laser beam expands into a beam that illuminates the GPCR array in each well simultaneously. Each image acquisition captures the fluorescence image of the GPCR array in one well. After each acquisition, a translation stage moves the micro-plate to the next assay well until all wells are measured.

According to another aspect of the present invention, a functional assay detection system for membrane bound proteins is provided. The system comprises a biological array including a porous substrate having a plurality of membranes adhered thereto and a first-side and a second side, a fluorescent labeling reagent configured to couple to the membrane bound proteins, a pulsed light assembly configured to excite the fluorescent labeling reagent, and a time-delayed imaging device configured to capture emitted fluorescence of the fluorescent labeling reagent. The pulsed light assembly is configured to excite the fluorescent labeling reagent from at least one of the first side and the second side of the porous substrate, and the fluorescent labeling reagent comprises a fluorophore that has an emission lifetime that is in the range of microseconds.

In yet another aspect of the present invention, a functional assay detection method for microarrays is provided. The method comprises the steps of providing a porous substrate having a plurality of membranes adhered thereto, introducing a fluorescent labeling reagent to the substrate, exciting the fluorophore of the fluorescent labeling reagent with a pulsed light assembly, and capturing the emitted fluorescence with a time-delayed device to generate an image of the fluorescent labeling reagent. The plurality of membranes each include a transmembrane protein which is accessible to assay agents on both sides of the membrane, and the fluorescent labeling reagent is configured to couple to the plurality of membranes.

In still another aspect of the present invention, a functional assay detection system for G protein-coupled receptor microarrays disposed on porous substrates labeled with an Europium chelate is provided. According to this aspect, the system comprises an ultraviolet pulsed light assembly that is configured to excite the Europium chelate, and a time-delayed imaging device that is configured to capture emitted fluorescence of the Europium chelate.

Other advantages may well be apparent to one of skill in the art upon consideration of the description of the invention and claims contained herein.

BRIEF DESCRIPTION OF THE DRAWINGS

The above-mentioned aspects of the present teachings and the manner of obtaining them will become more apparent and the teachings will be better understood by reference to the following description of the embodiments taken in conjunction with the accompanying drawings, wherein.

Corresponding reference characters indicate corresponding parts throughout the several views.

DETAILED DESCRIPTION

The embodiments of the present teachings described below are not intended to be exhaustive or to limit the teachings to the precise forms disclosed in the following detailed description. Rather, the embodiments are chosen and described so that others skilled in the art may appreciate and understand the principles and practices of the present teachings.

Before describing the present invention in detail, it is initially noted that this invention is not intended to be necessarily limited to specific compositions, reagents, process steps, or equipment, as such may vary. As used in this specification and the appended claims, the singular forms "a," "an," and "the" include plural referents unless the context clearly dictates otherwise. It is also to be understood that the terminology used herein is for the purpose of describing particular embodiments only, and is not intended to be limiting. All technical and scientific terms used herein have the usual meaning conventionally understood by persons skilled in the art to which this invention pertains, unless context defines otherwise.

Generally, the present invention is directed to a system for detecting fluorescent based assays of membrane proteins on a porous substrate. Unlike conventional substrates which are transparent to light, the present substrates are opaque. Moreover, the present substrates are accessible from both sides of the membrane, rather than merely being accessible from only one side, such as is found with conventional assay supports.

Figure 1A:
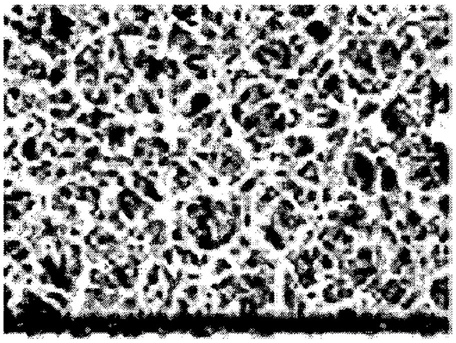
FIG. 1A depicts a SEM image of a 3D surface of a porous substrate in accordance with the present invention.

As shown in FIG. 1A, the porous micro-well plates of the present invention have a three-dimensional porous substrate as part of a support surface within each well. Such porous substrate microplates are described in U.S. patent application Ser. No. 10/822,385 to Fang et al, the disclosure of which was previously incorporated by reference herein. In general terms, the plates comprise a frame having a number of wells, each defined by at least a sidewall, and a planar substrate having a surface with a number of first and second areas. The first areas each have a porous layer or patch for immobilizing probe species, while the second areas do not have such a porous layer. The first and second areas are adjacent to each other, and the second areas, as part of an understructure, serve as a support for each of the porous layers. The porous layer in each first area forms at least a partial over-layer of the second area, and the frame and planar substrate are joined together to form a multi-well plate, in which each first area forms part of a bottom surface of the wells.

The frame and understructure support each (or both) can be made from a glass, ceramic, crystalline, or polymer plastic material, as well as a combination of these materials. The porous substrate microplates of the present invention have particular use in surface-mediated bioassays including microarray-based bioassays for basic research, pharmaceutical, clinic and diagnostic applications. Additionally, these devices offer significant advantages for surface-mediated bioassays. Compared to traditional glass or polymer bottom microplates, the use of porous substrates generally gives rise to much higher loading capacity, as well as higher binding specificity and accessibility of target molecules to the probes immobilized on the surfaces of the porous substrates. In addition, the use of glass bottom support plates not only offers excellent optical properties of glass materials, which are desirable for conventional and popular optical-based detection, but also provides excellent overall flatness across the whole microplate, thereby reducing well to well variability.

The porous substrates of the present invention can be any material whose surface bears hydroxyl groups. An example of those types of substrates would be glass, silica, metals, or polymers whose surface has been modified to create hydroxyl groups thereon, for example by a chemical oxidizing treatment or with a plasma, or alternatively coated with a layer of glass, silica or metal by techniques such as sputtering, chemical deposition in the vapor phase, or sol gel. In many cases, the pore size of the substrate is greater than 0.05 μm.

Figure 1C:
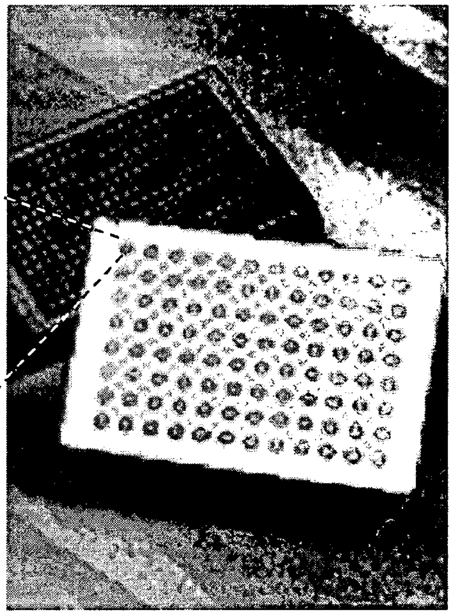
FIG. 1C depicts a porous substrate well plate for performing a functional GPCR assay in accordance with the present invention.
Figure 1B:
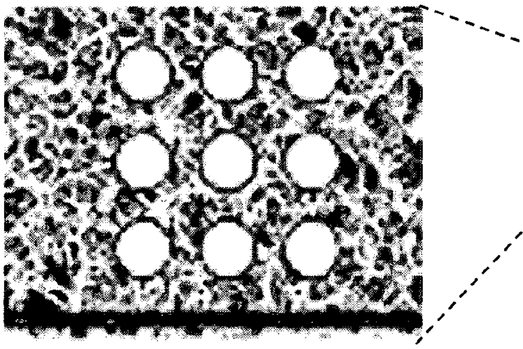
FIG. 1B depicts a 3×3 GPCR microarray on a porous surface in accordance with the present invention.

The present invention is also directed to fabricating microarrays onto the three-dimensional porous substrates and using the microarrays for both ligand agonism and compound screening. Rather than merely immobilizing the microarrays to the top surface of the porous layer, the porous substrate physically traps the biological membranes within a porous matrix. Despite being trapped within the porous matrix, the biological membranes still have a naturalistic degree of movement and retain full bio-functionality. Moreover, both sides of the biological membrane fragments are fully accessible to a target compound or biological species. An illustration of an exemplary membrane protein microarray in accordance with the present invention can be seen with reference to FIG. 1B. This microarray is fabricated onto a microplate, such as shown in FIG. 1C, by dispensing aliquots of the membrane protein onto the substrate surface within each well of the porous substrate well plate.

It should be understood herein that the porous layers of the present invention can be either unmodified or modified with a surface chemistry that is configured to enhance the attachment of biological species to its structure. Exemplary surface chemistries may be selected from a silane, a polymer, or a biological coating. Moreover, the silane coating may be selected from 3-acyloxypropyl-trimethoxysilane, allyltrichlorosilane, 3-aminpropyltriethoxysilane, N-(6-aminohexyl)aminopropyl-trimethoxysilane, bis(triethoxysilye) methane, 2-cyclohexenyl)ethyl)triethoxysilane, 3-glycidoxypropyl-trimethoxysilane, while the polymer coating may be selected from chitosan, epoxy-presenting polymers, an anhydride-presenting polymer, NHS-ester-presenting polymer, aldehyde-presenting polymer, poly-ethylene-amine, or poly-lysine. The biological coating may be selected from antibodies, protein-A, protein-G, lectin and wheat-germ-agglutinin.

As is generally known herein, the fabrication of biological arrays on microplates, especially membrane-protein or GPCR microarrays, can be particularly challenging. This is mainly due to the fact that the GPCR needs to be associated with a lipid membrane to retain a correct folded conformation and function. Previously, workers in this area have attempted covalent immobilization of the entire membrane to a substrate surface. However, this technique is not desirable because lateral mobility is an intrinsic and physiologically important property of biological membranes. In addition, the GPCR-G protein complex should be preserved after being arrayed onto a surface because the correct configuration of the receptor and G protein is a prerequisite for the binding of agonists to the receptor with physiological binding affinity. The surface could have a significant impact not only on the structure and functionality of the receptors, but it also plays a critical role in the structure and mechanical stability of the immobilized lipid membranes.

In U.S. patent application Ser. No. 09/854,786 (now U.S. Pat. No. 6,977,155) and U.S. patent application Ser. No. 09/974,415 (each of which are incorporated herein in their entirety by this reference), robotic printing techniques for fabricating biological membrane-protein microarrays on two-dimensional, amine-coated, inorganic substrates (e.g., gamma-aminopropylsilane (GAPS) surfaces) are described in great detail. These techniques demonstrate that a GPCR microarray can be made using cell-membrane fragments or preparations, while maintaining desired structures, lateral fluidity, and significant mechanical stability. The microarrays allow specific binding of ligands to their cognate receptors in the array. The binding affinities and profiles of these ligands are similar to those obtained using traditional methods, including solution-based or cell-based assays.

Moreover, using a fabrication technique, like screen printing or tape casting, such as mentioned in U.S. patent Ser. No. 10/101,135 (now U.S. Pat. No. 6,750,023), which is incorporated herein by reference, one can prepare an array of 96, 384, or 1536, patches of silica frit on an inorganic support plate. Silica frit, according to an example, is suspended and homogenized in an organic-based solution to spread the frit particles in a mask or screen. After printing, the frit patches are sintered, for example at a temperature of about 650-750° C., to harden, fuse together, or consolidate the particles to a desired density to form a porous wafer or matrix stably associated with the support plate. Each porous wafer is coated with GAPS. Afterwards, the porous-wafer-presenting support plate is subsequently assembled with a well plate, such that each porous wafer forms part of the bottom of each well.

After assembly, a biological membrane array is deposited onto each porous wafer. The array content can be the same or different from well to well. For instance, the biological membrane could be a cell-membrane fragment preparation, a lipid vesicle containing reconstituted membrane-protein, a lipid micelle containing a membrane-protein or an exosome vesicle particle containing at least a membrane-protein of interest. For binding assays using a GPCR microarray, a cocktail solution of labeled ligands in either the presence or absence of a target compound is typically applied to each array.

After the GPCR microarrays are fabricated onto the well plates, the plates are incubated for approximately 30 minutes in a GPCR functional assay buffer containing GDP. Exemplary functional assay buffer solutions according to the present invention are disclosed in U.S. patent application Ser. No. 11/312,776, which is incorporated herein in its entirety by this reference. One such exemplary buffer solution for functional assays according to a GTP-analogue-binding profile approach includes the following components: a) a buffer reagent with a pH in the range of about 6.5 to about 7.9; b) a divalent inorganic salt, optionally together with a monovalent inorganic salt, at a concentration from about 1 mM to about 500 mM; c) GDP salt at a concentration of about 0.5 mM to about 50 mM (preferably 1-10 mM); and optionally a combination of: d) a blocker reagent at a concentration of about 0.01 wt. % to about 2 wt. % of the composition, e) protease-inhibitor at a concentration of about 0.001 mM to about 100 mM, or f) an anti-oxidant reagent at a concentration of 0.01 mM to about 100 mM.

After the incubation process, a GTP labeled analogue and desired agonists are added to the positive functional assay wells, while the negative assay wells (which serve as controls) receive GTP labeled analogues without any agonist. After another 30 minutes of incubation, the assay solution is removed from each well and the microarrays are washed three times with GTP washing buffer. The activation of the GPCRs is then measured by the exchange of GDP for GTP at the Gα subunit of the trimetric G-protein (Gαβγ) complexed to the receptor (see Haga, T., and Berstein, G., G-Protein-Coupled Receptors, CRC Press, Boca Raton, Fla., 1999.). The amount of the labeling reagent in the GPCR microarrays is used to determine the GPCR activation by the respective agonist.

As is generally known, probes or other agents in an array assay can be conjugated, either covalently or non-covalently, with one or more labeling moieties. These labeling moieties can include compositions that are detectable by optical, spectroscopic, photochemical, biochemical, bioelectronic, immunochemical, electrical, chemical or other means. Examples of suitable labeling moieties include radioisotopes, chemiluminescent compounds, labeled binding ligands, labeled agonists or antagonists, heavy metal atoms, spectroscopic markers, such as fluorescent markers or dyes, magnetic labels, linked enzymes, mass spectrometry tags, spin labels, electron transfer donors and acceptors, and the like. One specific class of labeling moieties includes lanthanide ions or chelates such as Europium (Eu), Samarium (Sm), Terbium (Tb), Dysprosium (Dy) and Holmium (Ho). These labeling reagents have been found particularly useful in detection assays because they fluoresce at specific known wavelengths and have unique fluorescence properties. Moreover, when compared to traditional fluorescent compounds, the lanthanide compounds have a much longer emission lifetime. For instance, the emission lifetime of a lanthanide ion is often measured in hundreds of microseconds, whereas traditional organic reagents have lifetimes measured on the scale of several nanoseconds. In addition, lanthanides have been found to exhibit a large Stokes shift, with excitation occurring by absorbance of UV light with emission wavelengths greater than 500 nm. (see "Time-Resolved Fluorescence (TRF)," BioPal™ BioPhysics Assay Laboratory, Inc., www.biopal.com/Fluorescent.htm).

It should be understood and appreciated herein that the labeling reagents of the present invention can include any fluorescent labeling marker that has a long decay time (i.e., an emission lifetime measured in microseconds rather than nanoseconds). One such labeling reagent that may be used as a fluorescent tag in the present assay system is Europium. More particularly, Europium-chelate labels have been recently developed that allow for a larger shift between the excitation wavelength of 351 nm and the detection wavelength of 615 nm. This increased Stokes shift allows for easier discrimination between the excitation and fluorescence wavelengths. However, it has been discovered that the 351 nm excitation wavelength needed is not compatible with standard biological-assay reader-instrumentation and substrate materials, since this UV wavelength causes auto-fluorescence in most commonly used glass materials. Even small impurity levels can cause an autofluorescence signal which increases the background during the measurement. As such, the present invention features the use of UV-compatible opaque porous substrate materials that rely on the detection of fluorescently labeled molecules to perform biological assays. This UV compatibility allows for reduced background signal and consequently enhanced detection sensitivity. Moreover, unlike flat glass surfaces, the present porous substrate materials provide further detection enhancing sensitivity, such as enhanced signal sensitivity. This signal enhancement is partially attributed to the increased effective assay volume, as well as to the increased scattering facilitated by the micrometer-scale surface particles of the substrates. The increased scattering increases the effective optical path length of a photon impinging on the substrate device. The increased photon path-length causes an increase in the probability that the photon encounters an optically active atom absorbing at the photon's wavelength. This effect leads to a larger absorption probability of the optically active label and hence to increased emission of down-converted fluorescence photons. While the above analysis is of general validity, other material properties, such as intrinsic material absorption, play an important role in the achieved signal to noise. When the excitation wavelengths are in the ultra-violet wavelength range, certain materials autofluoresce. The use of UV-compatible opaque porous substrates can significantly reduce background fluorescence when illuminated with UV light. This leads to better signal to noise and enhanced signal sensitivity.

Figure 3:
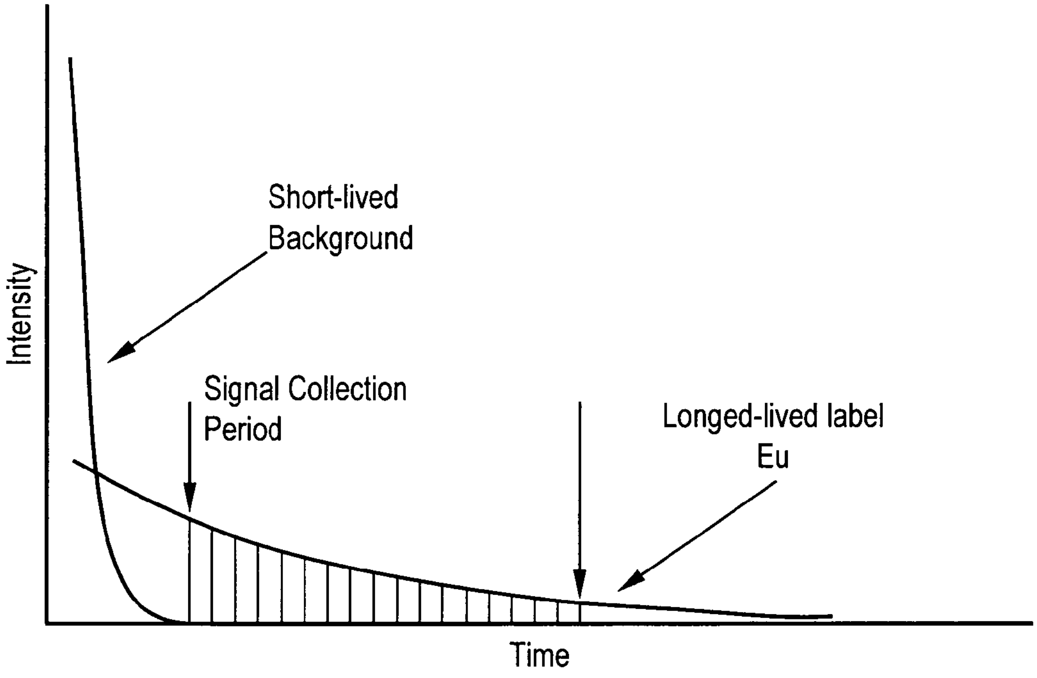
FIG. 3 depicts Eu fluorescence lifetime vs. non-specific background fluorescence life time.

In one exemplary embodiment herein, Eu-GTP serves as the GTP labeled analogue reagent and is added to exchange the GDP in the GPCR functional assay platforms. The fluorescence lifetime of Eu-GTP is several orders of magnitude longer than that of the non-specific background, allowing capture of Eu emission with a delay after excitation to eliminate short lived non specific fluorescence from membrane, substrates, etc. The amount of Eu in the GPCR microarrays is used to determine the GPCR activation by the respective agonist. The measurement of Eu-GTP attachment in the GPCR microarrays is based on the fluorescence lifetime difference between the non-specific background signals (auto fluorescence and scattering signals from membrane proteins, substrates, etc) and the specific fluorescence signals from a target of interest, Eu-GTP (see FIG. 3).

Figure 2:
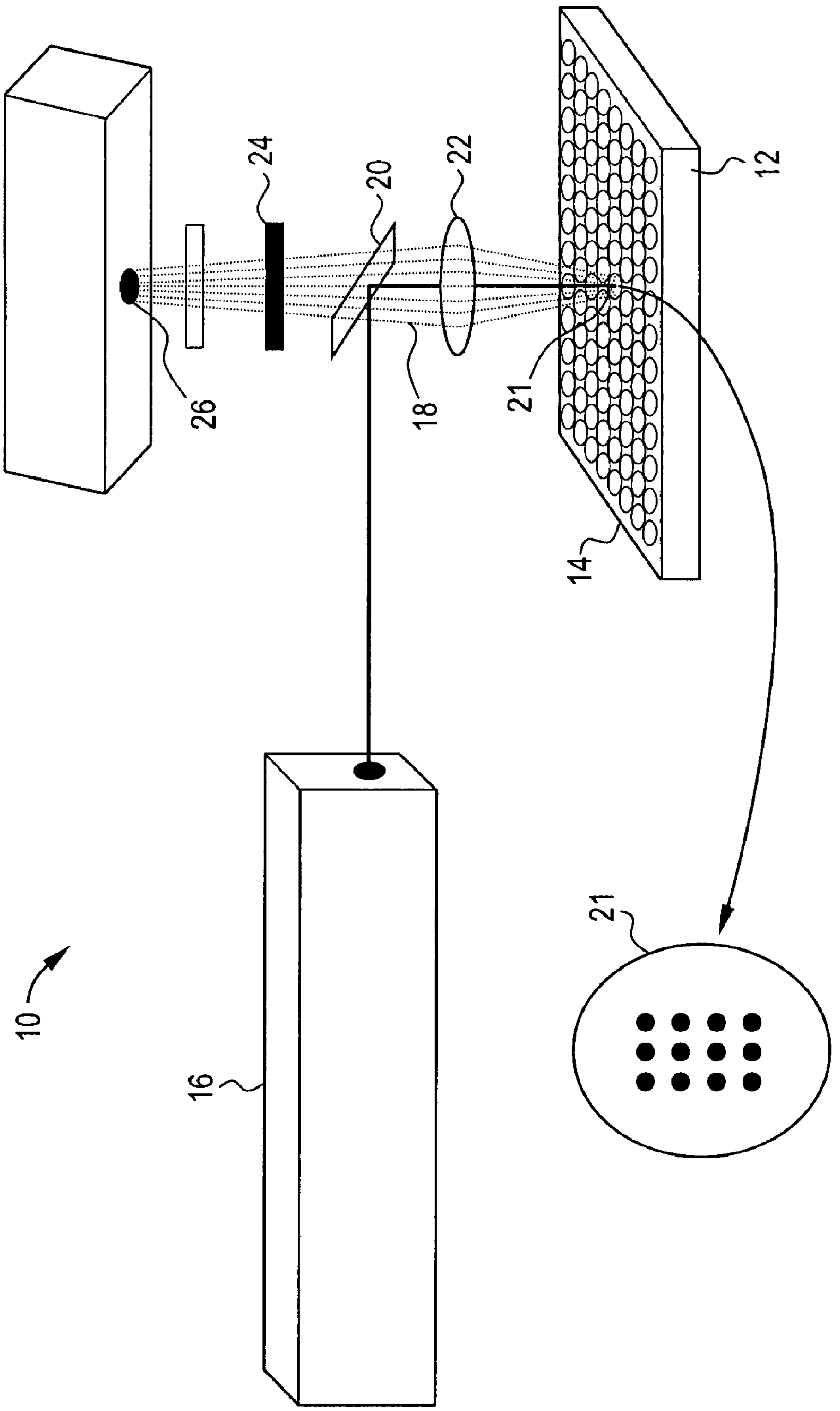
FIG. 2 depicts a time-delayed fluorescence array imager for performing a microplate GPCR functional assay in accordance with the present invention.

FIG. 2 illustrates an exemplary measurement instrument for detecting time-delayed fluorescence signals of GPCR functional assays in a micro-well plate format in accordance to the present invention. Instrument 10 has an x-y-zeta translation stage 12, which is used to control the movement of well plate 14. Stage 12 is configured to rotate the plate holder to a loading position where the well plate is placed onto the place holder by an operator or a robot (not shown). After well plate 14 is secured to the holder by pneumatic piston mounts, stage 12 swings well plate 14 to a measurement position. Laser 16 is then used to excite the labeling reagent tag in the samples by producing laser beam 18. An exemplary laser source which can be used in accordance with the present invention is a UV laser, such as a Q-switched laser or a Continuous Wave (CW) laser. Whatever UV laser source is chosen, it is important that the laser be configured to generate laser pulses to achieve the time-gated/delay function of the present detection system. As such, the laser itself can be configured to generate the laser pulses or it can be alternatively coupled to a chopper or optical modulation device (e.g., acousto-optical modulator, electro-optical modulator) that is adapted to interrupt the laser beam and thereby cause a pulsing effect. Such optical modulation and chopper devices are generally known within the art and do not require further discussion herein. A specific laser source that can be used in accordance with the present invention includes a Q-switched solid pulse UV laser that operates at 355 nm, such as model number UVSQAOM355-10 manufactured by MeshTel Intelite, Inc., Genoa, Nev.

During operation, laser beam 18 is directed into well 21 of well plate 14 by adjusting the position of dichroic mirror 20. When beam 18 contacts mirror 20, it is expanded so that the beam covers the bottom of well 21 and illuminates microarrays 23. Next, the emitted fluorescence of the labeling reagent (e.g., Eu) within the well is collected by lens 22, and then filtered by band-pass filters 24 (e.g., 615 nm band-pass filters) before reaching sensing device 26. It should be understood herein that the wavelength of the laser can represent the excitation wavelength of the fluorophore and that the band-pass filter can correspond to the emission wavelength of the selected fluorophore.

Here, sensing device 26 is a charge-coupled device ("CCD") sensor that is associated with an intensified charge-coupled device ("ICCD") camera; however, it should be understood and appreciated that other camera devices having time-delayed generators may also be used as the sensing device of the present teachings. For instance, another sensing device that may be used according to the present teachings is a complementary metal oxide semiconductor (CMOS) camera with a delayed generator (see for instance, http://www.dalsa.com/markets/ccd_vs_cmos.asp). Many other detection sensor systems may also be used, provided they are able to: 1) detect extremely low levels of fluorescence light emanating from the biological assay, 2) recreate a fluorescence image of the assay well, and 3) rapidly block/unblock the sensor element so as to provide time-resolved functionality (avoid sensing the optical pump pulse). The first requirement usually indicates a need for some type of amplification, such as can be found in an intensified CCD or an electron-multiplied CCD system, for example. The first requirement can also be satisfied through the use of an ultra-low noise CCD, where the sensor can detect light for a relatively longer exposure period to overcome the need for amplification of the incoming fluorescence light. This configuration will generally suffer from slower acquisition speed however, and the overall microplate reading time will be much longer and therefore less desirable than the intensified CCD embodiment of this application.

A CCD device absorbs light in each semiconductor pixel, generating roughly one electron for each photon of light absorbed. After a small amount of time spent absorbing photons, a CCD camera will empty each pixel "well" by transferring the electrons out of the device and recording the number found in each pixel. Electrons are typically transferred by row, serially from one pixel to its neighbor, until they reach the edge of the sensor array and their numbers recorded. The number of electrons corresponds to the amount of light from the pixel, and an image can therefore be reconstructed row-wise. It is important to note that most CCD cameras must shutter (block) any light from reaching the sensor during the electron transfer phase, lest new incoming photons add randomly to those being shifted from neighboring pixels, resulting in a blurred image. Once the electrons are transferred, the wells are again empty to absorb more light to take another picture, so the shutter can be opened and the cycle repeated. Each pixel "well" is furthermore capable of absorbing only a certain number of photons (before the well is completely filled by electrons), and camera users must configure the camera such that the time allowed for photon absorption is long enough to obtain sufficient signal-to-noise, but short enough that the well is not over-filled.

An intensified CCD has an extra complexity in that there is a light intensifier placed before the semiconductor sensor wells. This intensifier can amplify the light entering the device so that more photons ultimately hit the sensor, which is useful for detecting very small light levels. The intensifier relies on a high voltage to control the amplification process, and this intensifier can therefore also act as an optical shutter, since a voltage of zero prevents any light from reaching the sensor. As a result, most intensified CCD cameras require no additional electron transfer shutter since they take advantage of the intensifier voltage to provide this shutter function (to avoid blurring of the image).

According to one aspect of the present invention, an intensifier shutter is used to block autofluorescence light from striking the CCD sensor during an optical pump pulse, and to allow the passage of light during the desired fluorescence emission period. This cycle occurs many thousands of times per second (according to the pump light repetition frequency), providing numerous repetitions of data so that averaging can be used to reduce noise. The amount of fluorescence light resulting from a single pump pulse is very small however, and may not even exceed the average electron noise present in each well of the CCD sensor. If the CCD were to additionally transfer the electrons for readout during each pump pulse (when the intensifier is closed), the signal-to-noise would therefore be exceedingly small. For this reason, it is useful to allow the electrons to accumulate in each pixel well over the course of many optical pump pulse cycles, to collect many fluorescence photons and thereby exceed the electron noise in each CCD sensor pixel well. While many CCDs actually require that the pixel wells be emptied each time the intensifier shutter is closed (even if the wells are quite empty), the present setup is arranged such that the intensified CCD allows separate control of the intensifier shutter and the electron transfer. As such, the present system is capable of integrating many pulses of fluorescence light in the sensor wells before transferring the resultant electrons for readout. This results in increased signal-to-noise, which is effective for operation of the system.

Figure 4:
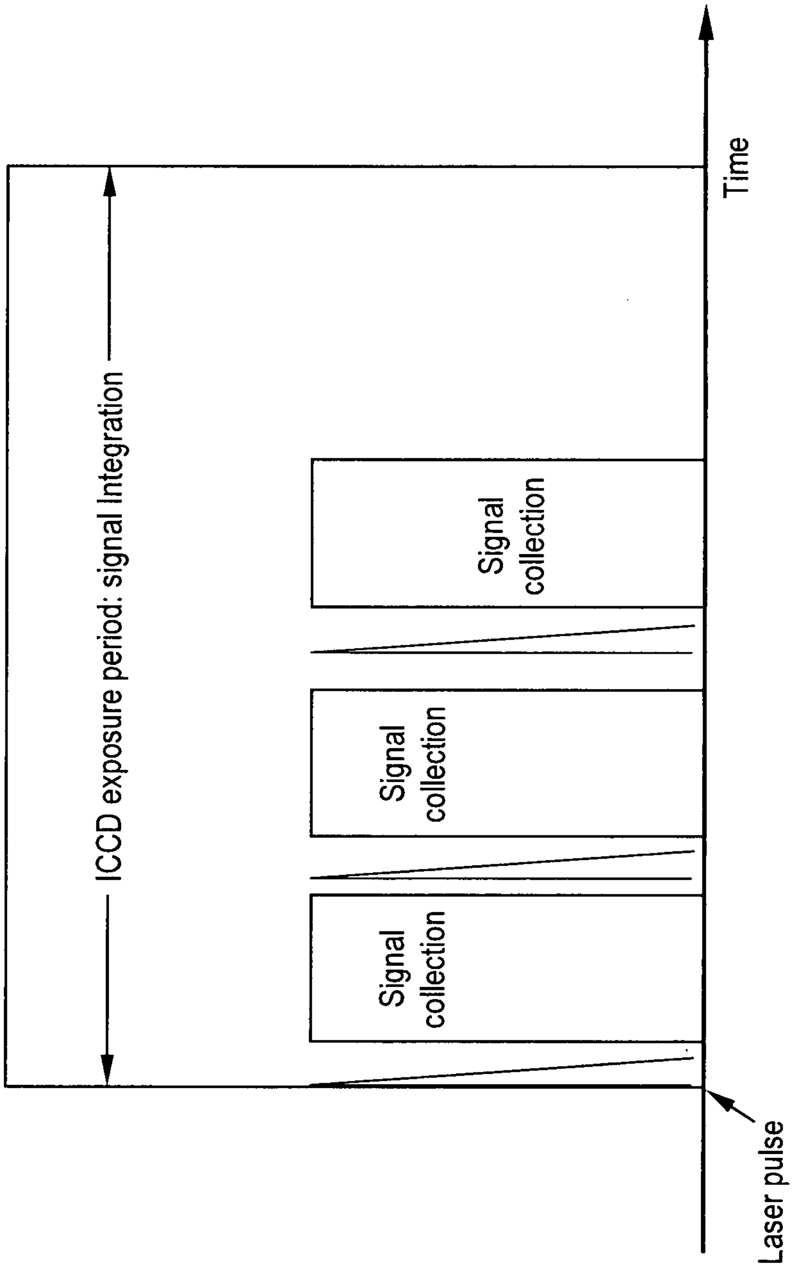
FIG. 4 depicts time-delayed fluorescence image acquisition triggered by laser pulses in accordance with the present invention.

FIG. 4 serves as an example of the above described optical pulse and shutter interplay. Synchronized laser pulses trigger the acquisition cycle of the ICCD camera, which is governed by the exposure time (designated time between electron transfers from the CCD to the readout electronics). In the meantime, the laser pulse also triggers a digital delay generator (DDG) built into the ICCD camera to send out a trigger pulse after a delay in time. While the time delay of the trigger pulse will depend on the laser pulse width, DDG speed and the lifetime of the non-specific binding background, in certain exemplary embodiments, the time delay is about 100 μs. The trigger pulse triggers the DDG (either directly or indirectly) to open an intensifier tube/shutter (not shown) for a certain amount of time (pulse width) to amplify and allow fluorescence light to reach the sensing device 26 (signal collection period). The laser and DDG pulse many thousands of times per second, allowing many fluorescence pulses to reach the sensing device 26, which accepts the light continuously for the entire duration of the acquisition while the intensifier is opening and closing. The electron charge is built into sensing device 26 until the exposure time is complete, and then the signal is readout as an image (electron transfer). After completing the signal acquisition for one well, stage 12 continually moves to the next well of well plate 14 until all the desired measurements are completed. According to this exemplary embodiment, a full 96-well plate measurement can be completed in less than 5 minutes.

It should be understood herein that the pulse width of the laser will depend on the specifications of the laser used, as well as the lifetime of the labeling reagent used during the application. However, the laser pulse should be less than the lifetime of the labeling reagent. For instance, in certain exemplary embodiments the pulse width can be about 10 times less than the lifetime of the labeling reagent, such that when the lifetime of the labeling reagent is about 100 μs, the pulse width of the laser is less than about 10 μs. Similarly, the laser pulse frequency will also depend on the detection application being performed and on the laser being used, particularly as each laser operates at an optimized frequency range to produce stable, high laser output results. However, according to one exemplary illustration the laser pulse frequency is about 5 KHz.

To minimize electronic noise associated with the ICCD camera, the camera can be cooled to approximately −15° C. As is generally known within the art, an excitation laser beam does not have a uniform local intensity distribution because of its inherited Gaussian beam distribution. As such, the excitation source intensity must be normalized in the time-delayed fluorescence images in order to analyze the GPCR array functional assay results quantitatively. To accomplish this, the present system uses the fluorescence image of a glass slide homogeneously doped with Eu as a calibration standard to normalize the laser intensity.

Figure 5A:
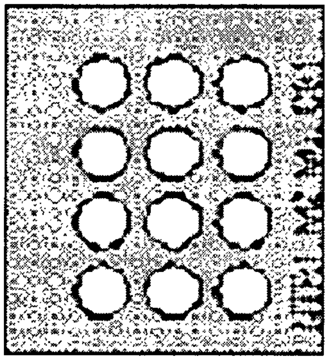
FIG. 5A depicts a multiplexed functional GPCR assay on a porous substrate in accordance with the present invention and having NTSR1, CHRM2, OPRM and CNR1 GPCR array receptors.

An exemplary GPCR microarray in accordance with the present invention is shown in FIG. 5A to demonstrate a multiplexed GPCR functional assay on porous substrates (see also, Functional GPCR Microarrays, Journal of the American Chemical Society, V127, p15350-15351, 2005, the disclosure of which is incorporated in its entirety herein by this reference). This microassay consists of three duplicates of four GPCRs, neurotensin receptor (NTSR1), cholinergic receptor muscarinic2 (CHRM2), opioid receptor mu (OPRM), and cannabinoid receptor (CNR1). The first step in the activation of GPCRs is exchange of GDP for GTP at the $G_\alpha$ subunit of the trimeric G-protein ($G_{\alpha\beta\gamma}$) complexed to the receptor; this nucleotide exchange is followed by dissociation of GTP.$G_\alpha$ from the GPCR-$G_{\beta\gamma}$ complex and binding to downstream effectors, such as adenylate cyclase. (see Haga, T., and Berstein, G., eds., G-Protein-Coupled Receptors, CRC Press, Boca Raton, Fla., 1999.). This activation is short-lived because the GTP bound to the $G_\alpha$ hydrolyzes back to GDP in a matter of seconds. Non-hydrolyzable analogues of GTP ($GTP_{nh}$) have been developed (see Valenzano, K. J.; Miller, W.; Kravitz, J. N.; Samama, P.; Fitzpatrick, D.; Seeley, L. *J. Biomol. Screen.* 2000, 5, 455-461); these analogues enable the convenient monitoring of GPCR activation by observation of bound fluorescent or isotope-labeled $GTP_{nh}$. Europium-labeled $GTP_{nh}$ (Eu-GTP) were chosen because compounds labeled with Europium chelates exhibit a large Stokes shift and have long fluorescence lifetimes, which can be used to effectively discard extraneous fluorescence and enable lower detection thresholds. (see Diamandis, E. P.; Christopoulos, T. K. *Anal. Chem.* 1990, 62, 1149A-1157A). A moderate-power, CW argon laser emitting at 351 nm was employed to pump the Eu-GTP; the emitted fluorescence was captured on an intensified CCD detector time-gated to integrate the fluorescence beginning approximately 100 μs after the pump pulse. The instrument was configured for reading arrays printed on slides at a resolution of 10 μm.

Ligand binding assays on GPCR microarrays printed on flat glass substrates coated with γ-aminopropylsilane (GAPS) have been reported. (see Fang, Y.; Lahiri, J.; Picard, L. *Drug Discovery Today* 2003, 8, 755-761; Tanner, C. W.; Tepesch, P. D.; Wusirika, R. R.; Corning Incorporated: U.S. Pat. No. 6,750,023 B2, 2003.) The binding constants of ligands estimated using these assays were consistently similar to those reported in the literature. Since ligand affinity is affected by the extent of G-protein coupling to the receptor (see Haga, supra), the results suggested that GPCR-G-protein complexes were conserved upon immobilization in the microarray. Functional assays using Eu-GTP on these flat surfaces were, however, unsuccessful. It was rationalized that the simultaneous accessibility of the ligand to the N-terminal domain of the GPCR and the Eu-GTP to the $G_\alpha$ subunit of the GPCRG-protein complex was hindered on the flat substrate. It was hypothesized that porous, three-dimensional substrates may lead to supported membranes with access to both sides of membrane-bound protein complexes. As such, porous glass substrates were tested because of the ability to derivatize the glass surface with silane chemistries; bare and derivatized glass have been extensively used as substrates for supported membranes. (see Groves, J. T.; Boxer, S. G. *Acc. Chem. Res.* 2002, 35, 149-157.). The porous frit also offers very high surface area and, therefore, presents the capacity for greater amounts of immobilization relative to flat substrates.

Porous glass slides were fabricated by casting a frit consisting of crushed and milled borosilicate glass powder onto an impermeable calcium aluminosilicate glass slide followed by sintering at approximately 700° C. The porous layers obtained were 15-20 μm thick with a mean pore size of approximately 570 nm. Slides containing segregated porous patches were obtained by manual scraping of the porous frit down to the impermeable support using a blade. These slides were then coated with GAPS. Printing of the GPCR microarrays was accomplished using quill pins as described previously.

GPCR microarrays consisting of the neurotensin receptor 1 (NTSR1), the cholinergic receptor muscarinic 2 (CHRM2), the opioid receptor mu (OPRM), and the cannabinoid receptor 1 (CNR1) were then fabricated. These receptors have important neurophysiological roles and have been implicated in a variety of disorders, ranging from Parkinson's disease to addiction. The receptors are coupled through the $G_\alpha$ proteins, $G_{i\alpha}$ or $G_{q\alpha}$ which are well suited for $GTP_{nh}$ assays. The GPCR microarrays were incubated for 1 hour in buffer containing GDP (3 μM) and Eu-GTP (10 nM), with or without an agonist. Excess GDP shifts the GDP-GTP equilibrium at the GR subunit and helps reduce basal fluorescence. FIG. 5 shows images of these arrays exposed to different ligands.

Figure 5B:
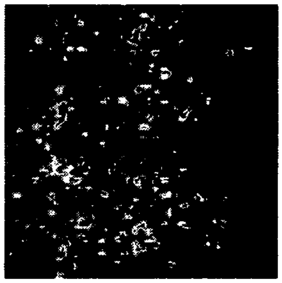
FIG. 5B depicts a multiplexed functional GPCR assay on a porous substrate in accordance with the present invention wherein the GPCR membrane is exposed to a functional assay buffer without agonists.
Figure 5C:
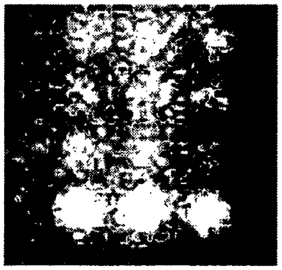
FIG. 5C depicts a multiplexed functional GPCR assay on a porous substrate in accordance with the present invention wherein NTSR1 is incubated with its agonist, neurotensin.
Figure 5D:
FIG. 5D depicts a multiplexed functional GPCR assay on a porous substrate in accordance with the present invention wherein CHRM2 is incubated with its agonist, oxotremorine.
Figure 5E:
FIG. 5E depicts a multiplexed functional GPCR assay on a porous substrate in accordance with the present invention wherein OPRM is incubated with its agonist, DAMGO.
Figure 5F:
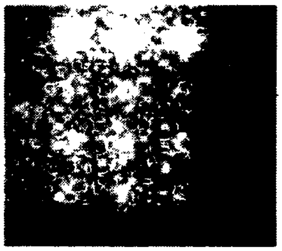
FIG. 5F depicts a multiplexed functional GPCR assay on a porous substrate in accordance with the present invention wherein CNR1 is incubated with its agonist, anandamide.
Figure 6:
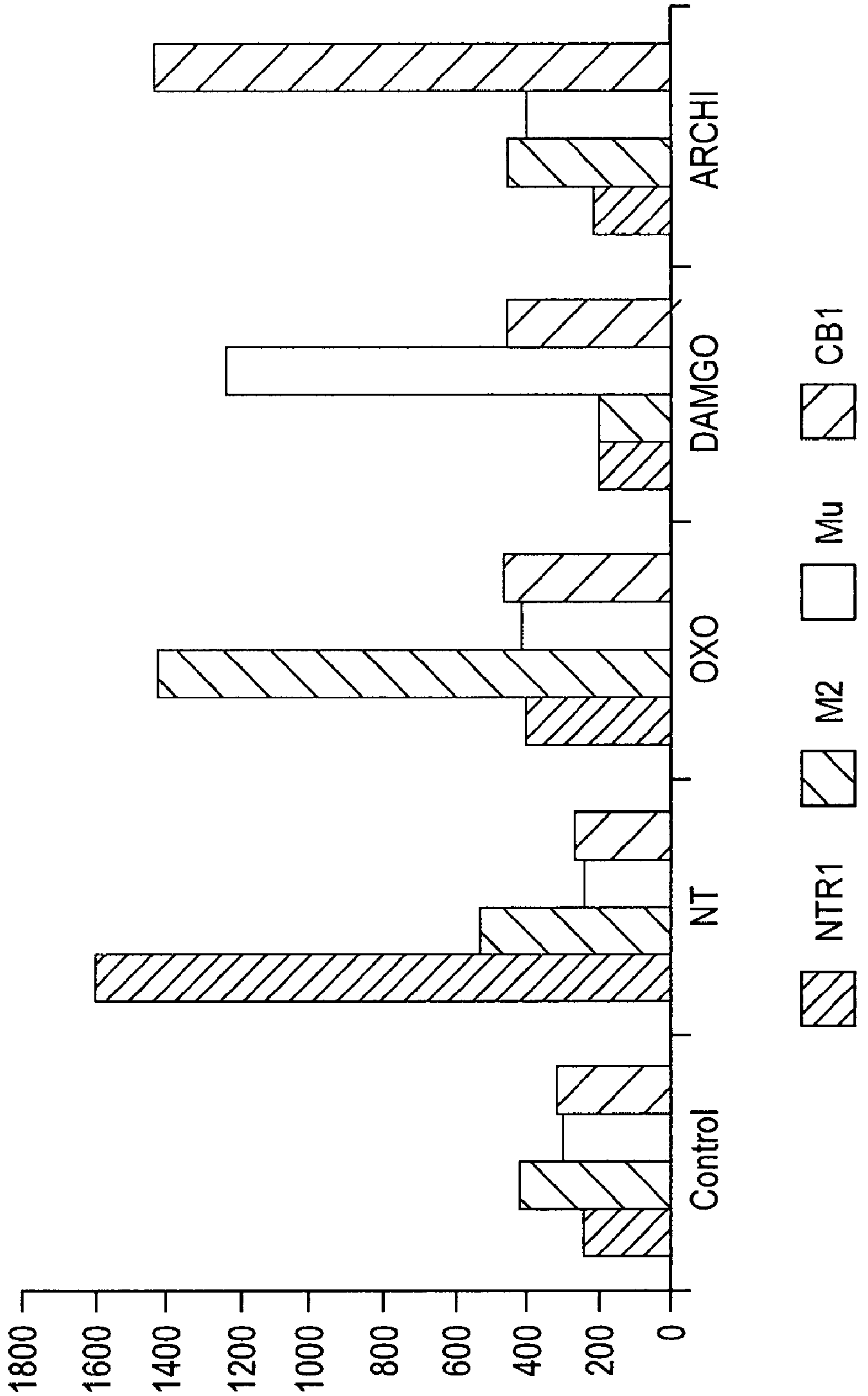
FIG. 6 depicts the selective functional activations of receptors in the presence of their respective agonists in accordance with the present invention.

FIG. 5B shows the images of a microarray that was incubated without any agonists, therefore only basal fluorescence of EU-GTP are observed on this image. FIG. 5C shows the image of the microarray exposed to agonist neurotensin, which is the physiological agonist for NTSR1. FIGS. 5D-5F represent the fluorescence images of CHRM2, OPRM, and CNR1 receptors that were exposed to agonist oxotremorine M, DAMGO and anandamide, respectively These images demonstrate the selective activation of those receptors by their respective agonists. Moreover, FIG. 6 represents a comparison of the images in FIGS. 5B and 5C, which shows a 5.7-fold difference of fluorescence signal from NTSR1 receptors, while the fluorescence signals from other receptors are similar. This comparison demonstrates the selective activation of the NTSR1 receptors by agonist neurotensin.

Details of the imager, substrate and array fabrication and assay protocols that support FIGS. 5 and 6 are provided below.

Materials and Methods: Cell membrane fractions containing human NTSR1, OPRM, CHRM2 and CNR1, and the Eu-GTP binding assay kit were purchased from Perkin-Elmer Life Science (Boston, Mass.). The concentration of active receptor ($B_{max}$) and the total protein concentration in the membrane preparations were specified by the manufacturer. For the membrane preparations used, $B_{max}$ values ranged from 0.4-1.7 pmol/mg and the concentration of total protein was in the range 7.2-14.2 mg/ml. GAPS was purchased from Gelest (Morrisville, Pa.). All other chemicals including agonists and antagonists were purchased from Sigma (St. Louis, Mo.).

Time-resolved Europium fluorescence imager: A moderate-power, CW argon laser emitting at 351 nm was employed to pump the Eu-chelate, and conventional bandpass and UV-reject optical filters were used to transmit the Europium fluorescence to an intensified CCD detector. In order to take advantage of the long decay lifetime of the Europium fluorophore, the pump light was chopped at ~300 Hz to establish a timebase, and the intensified CCD was time-gated to integrate the fluorescence beginning roughly 100 μs after the pump pulse; in this manner, any short-lived autofluorescence from the biological array was avoided. UV-grade optics were used to image onto a 512×512 pixel CCD, offering a resolution of ~10 μm.

Fabrication of porous substrates. Crushed borosilicate glass particles were sieved and wet-milled to a reduced particle size of about 2-3 μm. The particles were then attrition milled in isopropanol and Dextrol; solvent was removed when the average particles size was ~1.0 μm in diameter. The borosilicate powder was used in preparation of slip for tape casting or screen printing using Texanol® on impermeable calcium aluminosilicate 1"×3" glass slides (Code 1737). The porous-coated substrates were fired on alumina fiber boards at 700° C. for 2 hours and then cooled to ambient temperature. Segregated porous patches were made in a 8×2 format with a spacing corresponding to a 96-well microplate (9 mm). The porous layers obtained were 15-20 μm thick with a mean pore size of ~570 nm. Slides containing segregated porous patches were obtained either by manual scraping of the porous frit down to the impermeable support using a blade. These slides were then coated with GAPS. A wax pen (VWR) was used to create boundaries around the porous patches.

GPCR microarray fabrication. The fabrication of the GPCR microarray on GAPS coated glass porous slides was carried out using a quill-pin printer (Cartesian Technologies). Briefly, 10-15 μl of each GPCR membrane preparation was added to different wells of a 384-well microplate (Corning, Acton, Mass.). Replicate microspots were obtained using a single insertion of a quill-pin into the solution. After printing, the arrays were vacuum-dried for two hours, and then used for Eu-GTP binding assays.

Eu-GTP based Functional Assays. For the Eu-GTP binding assays, 100 μl of assay solution (50 mM HEPES, 100 mM NaCl, 5 mM $MgCl_2$, 3 μM GDP, 100 μg/ml Saponin and 10 nM Eu-GTP) in the presence or absence of agonist(s) and/or antagonist(s), was laid on top of the printed microarrays. Excess GDP shifts the GDP-GTP equilibrium at the $G_\alpha$subunit and helps reduce basal fluorescence. For the determination of $EC_{50}$, the microarrays were treated with different concentrations of the agonist based on 10-fold serial dilutions from point to point. $IC_{50}$ determinations were carried out at a fixed concentration of an agonist and different concentrations of 10-fold serial dilutions of an antagonist. After incubation for 1 hour in a humidity chamber, the assay solutions were quickly removed through vacuuming. The microarrays were then washed three times by dipping into 1× GTP wash buffer (supplied with the Eu-GTP binding kit from PerkinElmer Life Science) and blow-dried under nitrogen. The arrays were imaged on the time-resolved Europium fluorescence imager. The fluorescence intensities of the arrays were acquired using software developed in-house and analyzed using Microsoft Excel. The $EC_{50}$ and $IC_{50}$ values were estimated by non-linear regression analysis (Prism software, Graph Pad).

The appended claims set forth some aspects of the integrated thermochemical and biocatalytic energy production system described in its various embodiments believed to be patentable to Applicants. However, the various embodiments disclosed herein may include other inventions patentable to Applicants. Moreover, while exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A functional assay detection system for membrane bound proteins, comprising:

a biological array including a porous substrate having a plurality of membranes adhered thereto, the porous substrate having a first side and a second side;

a fluorescent labeling reagent configured to couple to the membrane bound proteins, the fluorescent labeling reagent comprising a fluorophore having an emission lifetime that is in the range of microseconds;

a pulsed light assembly configured to excite the fluorescent labeling reagent;

a charge-coupled device (CCD) camera comprising:

a digital delay generator (DDG), an optical shutter, and at least one sensor array of electrons wells; and a readout device, wherein the CCD is configured to allow separate control of the optical shutter and electron transfer from the sensor array so that a multitude of trigger pulses from the pulsed light assembly repeatedly trigger the opening and closing of the optical shutter to allow photons from the excited fluorescent labelling reagent to cause the accumulation of electrons in the sensor array wells over the course of many pulses of the pulsed light assembly while blocking the autofluorescence photons so that many pulses of fluorescent light can be integrated in each sensor well before subsequently transferring the electrons captured in the sensor array to a readout device for signal processing.

2. The system of claim 1, wherein the membrane bound protein is a G protein-coupled receptor.

3. The system of claim 1, wherein the fluorescent labeling reagent is a lanthanide chelate selected from the group consisting of Europium, Samarium, Terbium, Dysprosium and Holmium.

4. The system of claim 1, wherein the pulsed light assembly comprises a Q-switched laser.

5. The system of claim 1, wherein the time-delayed imaging device comprises a charged-coupled device.

6. The system of claim 1, wherein the fluorescent labeling reagent comprises Europium as the fluorophore and the pulsed light assembly is configured to excite the Europium at a wavelength of about 355 nm.

7. The system of claim 1, wherein the laser pulse has a laser pulse width less than the emission lifetime of the fluorophore.

8. The system of claim 1, wherein the optical shutter is an intensifier plate.

9. The system of claim 1, wherein the CCD is an intensified CCD.

10. The system of claim 1, wherein integration in the sensor wells before the subsequent transfer of electrons captured in the sensor array affords increases in the signal to noise ratio.

11. A functional assay detection system for G protein-coupled receptor microarrays disposed on porous substrates labeled with an Europium chelate, comprising:

an ultraviolet pulsed light assembly configured to excite the Europium chelate; and a time-delayed imaging device configured to capture emitted fluorescence of the Europium chelate wherein the time-delayed imaging device comprises a digital delay generator that is capable of being triggered by a laser pulse, the triggering of the digital delay generator being adapted to cause a shutter coupled to the imaging device to allow the emitted fluorescence to be collected and integrated over numerous laser pulses by a sensor.

12. The system of claim 11, wherein the porous substrate has a first side and a second side.

13. The system of claim 12, wherein the ultraviolet pulsed light assembly is configured to excite the Europium chelate from at least one of the first side and the second side of the porous substrate.

14. The system of claim 11, wherein the porous substrate is part of a microplate assay device having a plurality of wells, the plurality of wells being configured to contain the G protein-coupled receptor microarrays.

15. The system of claim 11, wherein the ultraviolet pulsed light assembly comprises a Q-switched laser.

16. The system of claim 11, wherein the time-delayed imaging device comprises a charged-coupled device.

17. The system of claim 11, wherein the time-delayed imaging device is a charge-coupled device.

18. The system of claim 17, wherein the CCD is an intensified CCD.

19. The system of claim 18, wherein the shutter is an intensifier plate.

* * * * *